(12) United States Patent
Frodsham

(10) Patent No.: US 6,195,395 B1
(45) Date of Patent: Feb. 27, 2001

(54) MULTI-AGENT PSEUDO-DIFFERENTIAL SIGNALING SCHEME

(75) Inventor: Tim Frodsham, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/044,508

(22) Filed: Mar. 18, 1998

(51) Int. Cl.[7] .................................................. H04B 3/00
(52) U.S. Cl. .................................... 375/257; 375/259
(58) Field of Search ................................. 375/257, 259, 375/285; 330/250; 333/12

(56) References Cited

U.S. PATENT DOCUMENTS

| 4,225,752 | * | 9/1980 | Looschen | 359/135 |
|---|---|---|---|---|
| 5,355,391 | * | 10/1994 | Horowitz | 375/257 |
| 5,483,110 | * | 1/1996 | Koide et al. | 375/257 |
| 5,498,990 | * | 3/1996 | Leung et al. | 327/309 |
| 5,548,226 | * | 8/1996 | Takekuma et al. | 327/321 |

FOREIGN PATENT DOCUMENTS 0 944 000 A2 * 9/1999 (EP) .............................. G06F/13/40

* cited by examiner

Primary Examiner—Tesfaldet Bocure
(74) Attorney, Agent, or Firm—Ben Burge

(57) ABSTRACT

A circuit for reducing the effect of noise on signals. The circuit includes a plurality of information signal lines having a substantially matched routing, and a reference voltage line having a routing substantially matched to the routing of the plurality of information signal lines. The circuit further includes a transmitting agent coupled to the plurality of information signal lines and to the reference voltage signal line, including a noise coupling circuit for coupling noise from the transmitting agent to the reference voltage line.

45 Claims, 9 Drawing Sheets

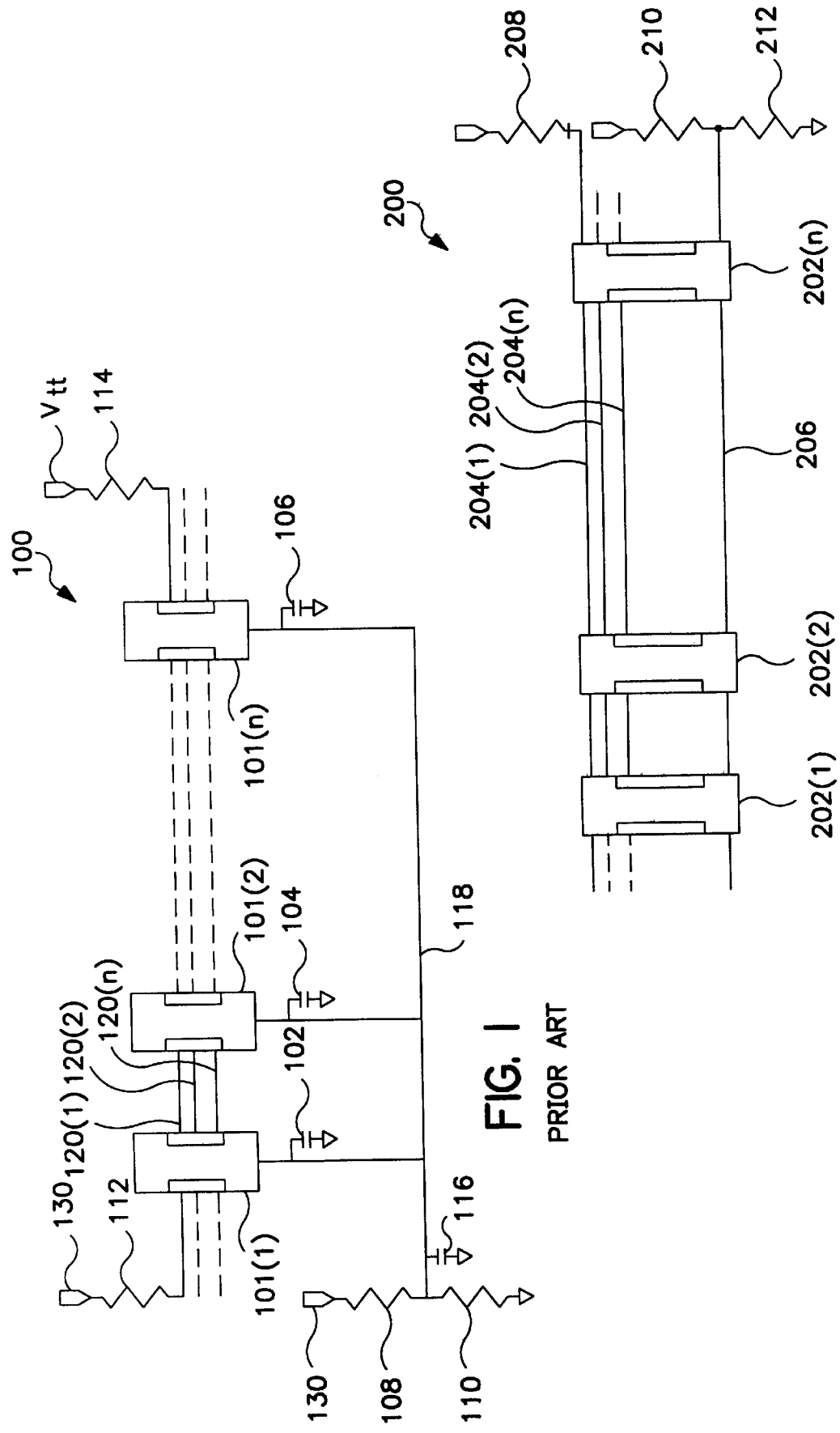

MULTI-AGENT PSEUDO-DIFFERENTIAL SIGNALING SCHEME

FIELD OF THE INVENTION

The present invention is in the field of digital signaling in computer systems. More particularly, the present invention is in the field of reducing the affects of noise on digital signals in computer systems.

BACKGROUND OF THE INVENTION

In a computer system, transfers of information between devices such as processors, memory controllers, and input/output units typically occur over a bus. Devices that transmit and receive data over a bus usually can control the bus at certain times. These devices are called bus agents. Examples of bus agents include processors and memory controllers. Information is usually transmitted between agents as voltage levels that are interpreted at a receiver as representing digital ones or digital zeros. Voltage levels below a certain level are interpreted as having a logic value of zero, and voltage levels over a certain level are interpreted as having a logic value of one. As signals travel through the computer system, they pick up noise. Noise is extraneous signals capacitively or inductively coupled to a digital signal line from inside or outside the system. Types of noise include core noise, or die noise generated by a particular integrated circuit die of the system. Types of noise also include system noise. System noise includes, for example, noise picked up by a signal from the environment through which it passes. System noise can be noise from the traces on a printed circuit board (PCB), noise from coaxial cable, noise from ribbon cable, or noise from any other electrical signal carrying medium.

In general, digital systems tolerate noise well because as long as a signal is interpreted correctly as high (indicating a one) or low (indicating a zero), no transmission errors occur. When noise becomes excessive, however, signals may go outside the noise margin. The noise margin is defined in terms of a high noise margin, affecting signals that should be interpreted as logic one, and a low noise margin, affecting signals that should be interpreted as logic zero. The high noise margin is defined as the difference between a minimum output voltage that will be available at a gate output when the output is supposed to be a logic one, and a minimum gate input voltage that will be unambiguously recognized by the gate as corresponding to a logic one. The low noise margin is defined as the difference between a maximum gate input voltage which will be unambiguously recognized by the gate as corresponding to a logic zero, and a maximum voltage that will be available at a gate output when the output is supposed to be logic zero.

Some signaling methods used by prior art computer systems take no steps to reduce the effects of noise. For example, in a system using standard complimentary metal oxide semiconductor (CMOS) components and standard single-ended switching, signals are sent and received with any noise they may have picked up. It is assumed that the noise margin will be great enough so that a receiving component can extract information from the signal without errors.

In some systems, for example in CMOS systems, it is often difficult to determine at what voltage a receiving circuit will switch logic values between one and zero. One reason the switching voltage may vary is that process variations exist between components. To control the voltage at which a receiver component will switch, some manufacturers transmit a reference voltage (Vref) signal to a differential receiver along with the information signal. The Vref level determines at what voltage the receiver will switch. FIG. 1 is a block diagram of prior art system 100 which uses such a Vref signaling scheme.

Referring to FIG. 1, a single reference voltage is established using a resistor divider (resistors 108 and 110) from voltage source 130. Any voltage source may be used to establish Vref. Vref signal line 118 carries the Vref signal. Decoupling capacitor 116 is at the point of Vref generation. Decoupling capacitors 102, 104 and 106 are each at a pin of a system agent.

System 100 includes agents 101(1), 101(2), through 101(n). Each of agents 101(1), 101(2), through 101(n) receive a Vref signal on Vref signal line 118. System 100 also includes information signal lines 120(1), 120(2), through 120(n). Each of information signal lines 120(1), 120(2), through 120(n) is carefully routed and terminated, for example with terminating resistors 112 and 114. Each of agents 101(1), 101(2), through 101(n) is a differential receiver that receives both the Vref signal over unrouted Vref signal line 118 and the information signals over routed information signal lines 120. No attempt is made to match the routing of Vref signal line 118 to the routing of any of information signal lines 120(1), 120(2), through 120(n). Therefore, any noise present on information signal lines 120(1), 120(2), through 120(n) is not likely to match noise on Vref signal line 118. These disparities in noise may cause a differential receiver to incorrectly interpret information signals.

This reference voltage signaling scheme was adequate in prior systems that operated at relatively low frequencies and with relatively high noise margins. Prior schemes are inadequate, however, in current, higher performance computer systems that operate at higher frequencies with lower noise margins. The lower signal settling times associated with higher frequency operation sometimes do not allow a signal to settle to a level within the lower noise margin before an attempt is made to interpret the signal.

Another prior art signaling scheme, known as differential signaling, uses two lines for each information signal. According to this method, for each signal sent on a line, a compliment of the signal is sent on a corresponding line. Both the signal and the compliment of the signal are sent to a differential receiver. The routing of the two lines carrying the signal and the compliment of the signal should be matched so that if noise is injected onto one signal, substantially the same noise should be injected onto the compliment of the signal. When the routing of lines is matched, characteristics such as length, impedance, velocity factor, and coupling of lines are made to be substantially the same. Matching the routing of lines may or may not involve routing lines in physical proximity to one another. Physical proximity is not important if the characteristics listed above are substantially the same between the lines whose routings are to be matched.

The differential receiver processes both signals received such that it perceives the difference between the signals, which should be substantially the same if both include very similar noise components. This signaling scheme has advantages over the previously described single-ended switching schemes. For example, even if noise levels are very high, noise on the complimentary signals should be effectively cancelled out by the receiver, so there is less danger of exceeding the noise margin.

True differential signaling schemes, in which each information signal line is paired with a complimentary signal line, have serious disadvantages. Most significantly, twice the physical area is used as compared to single-ended switching because one reference voltage signal line is required to be routed for each information signal line. In addition, pin count is increased because one reference voltage signal pin is required for each information signal pin.

SUMMARY OF THE INVENTION

A circuit for reducing the effect of noise on signals is described. The circuit includes a plurality of information signal lines having a substantially matched routing, and a reference voltage line having a routing substantially matched to the routing of the plurality of information signal lines. The circuit further includes a transmitting agent coupled to the plurality of information signal lines and to the reference voltage signal line, including a noise coupling circuit for coupling noise from the transmitting agent to the reference voltage line.

BRIEF DESCRIPTION OF THE DRAWINGS

FIG. 1 is a diagram of a prior art signaling scheme.

FIG. 2 is a diagram of one embodiment of a signaling scheme.

DETAILED DESCRIPTION

Figure 3A:
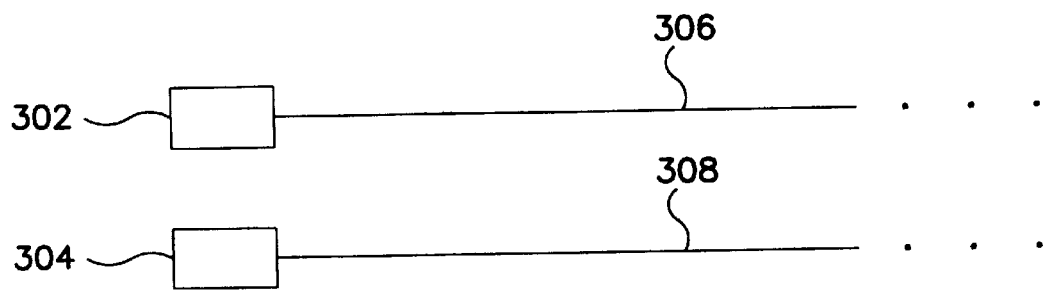
FIG. 3a is a generalized diagram of voltage sources.

A pseudo-differential signaling scheme is described. In one embodiment of the signaling scheme, the routing of one reference voltage (Vref) line, is matched to the routing of a certain number of information signal lines over a transmission medium between system agents. Agents of the system may be integrated circuits that can each be configured as a driver only, as a receiver only, or as both a driver and a receiver. Agents may be integrated circuits such as processors and memory controllers. Agents may also be transceiver components or translator components that transmit signals between different electrical protocols.

Typically, when an agent is configured as a driver, the agent has control of a system bus. When configured as a driver, a noise coupling circuit within the agent couples die noise from the integrated circuit of the agent onto the Vref signal line. The driving agent transmits both an information signal with die noise, and a Vref signal with die noise, over matched routes through a transmission medium to a receiving agent. The receiving agent receives the information signal and the Vref signal. Both of the received signals include substantially similar die noise components and system noise components. A common mode rejection device on the receiving agent rejects substantially all of the coupled noise and extracts the information signal.

FIG. 2 is a block diagram of a pseudo-differential signaling scheme according to one embodiment of the present invention. System 200 is a part of a computer system including multiple agents 202. Agents 202 may be various system components that each transmit and/or receive signals from another agent, such as a microprocessor or memory controller. In FIG. 2, agents 202(1), 202(2), through 202(n) are shown. The exact number of agents 202 is not significant to the invention. Each agent 202 is coupled to a group of information signal lines 204, which includes information signal lines 204(1), 204(2), through 204(n). Agents 202 are each also coupled to a reference voltage (Vref) line 206. Information signal lines 204 and Vref line 206, in this embodiment, are part of a computer system bus. In one embodiment, there are sixteen (16) information signal lines 204 for one Vref signal line 206. As described in more detail below, several groups of information signal lines, each with different numbers of individual signal lines may each be associated with one Vref signal line. Several groups of information signal lines and their associated Vref lines may be received by a single agent 202.

The routing of each information signal line of signal line group 204 is matched. That is, for each information signal line 204(1) through 204(n), the length, impedance, velocity factor, and coupling are made to be substantially the same. This causes system noise picked up by signals on information signal lines 204 to be substantially the same at a receiving agent.

The routing of Vref line 206 is matched to the routing of information signal lines 204. Therefore, Vref line 206 will have a system noise component that is substantially similar to the system noise component on each of information signal lines 204.

In this embodiment, each of information signal lines 204 is terminated at each end using a termination device such as resistor 208. A particular Vref is established by the resistor divider comprised of resistors 210 and 212, whose equivalent impedance match that of resistor 208.

Vref may be generated in various ways from various sources. FIG. 3a is a diagram of a generalized Vref signal line 308 and generalized information signal line 306. Termination devices 302 and 304 may be any active or passive termination devices that provide acceptable impedance and voltage levels for termination of respective signals.

Figure 3B:
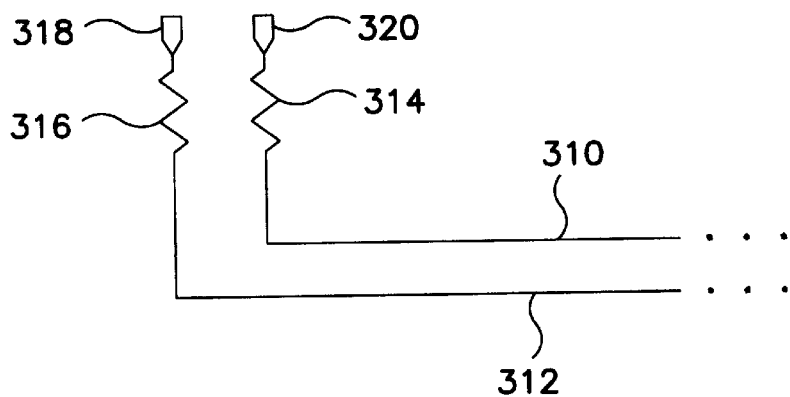
FIG. 3b is a diagram one embodiment of voltage sources.

FIG. 3b is a diagram of one embodiment of a Vref source. Information signal line 310 is terminated through resistor 314 in voltage source 320. Voltage source 320 is a constant voltage level appropriate for the relevant electrical protocol. For example, in one embodiment, Gunning transceiver logic ("GTL") is used and voltage source 320 supplies 1.5 volts. Vref signal line 312 is terminated through resistor 316 in voltage source 318. Voltage source 318 is also a constant voltage level provided as a reference to a receiver of Vref signal line 312 and information signal line 310. The voltage supplied by voltage source 318 is also appropriate to the electrical protocol used. In the case of the embodiment using GTL, voltage source 318 supplies 1.0 volt.

Figure 3C:
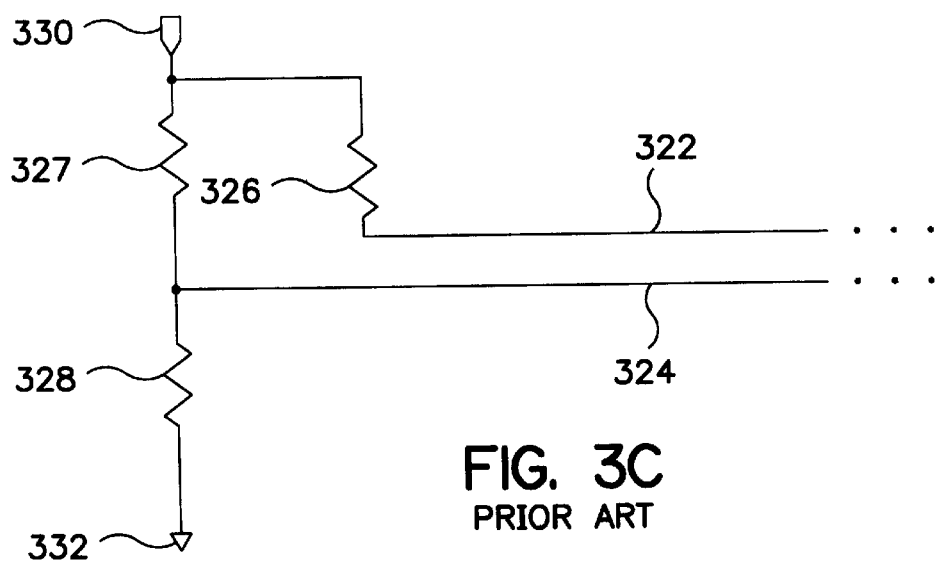
FIG. 3c is a diagram one embodiment of voltage sources.

FIG. 3c is a diagram of an alternate embodiment of a Vref source. In this embodiment, information signal line 322 is connected to source voltage 330 through resistor 326 in the same manner as in FIG. 3b. Vref, in this embodiment, is also generated by voltage source 330 as regulated by the resistor divider of resistors 327 and 328. Resistors 327 and 328 are sized such that they are the Thevenin equivalent of resistor 326. This embodiment generates Vref without the necessity of an additional power supply.

Figure 4A:
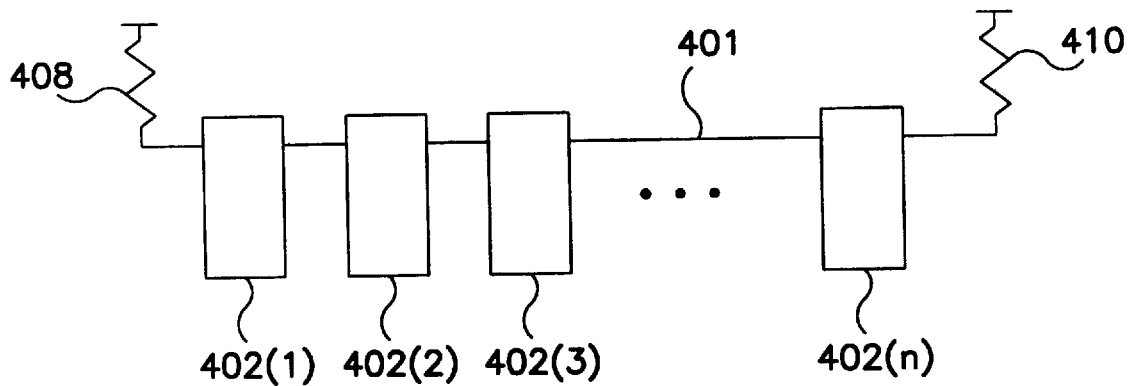
FIG. 4a is a diagram one embodiment of a termination scheme.
Figure 4B:
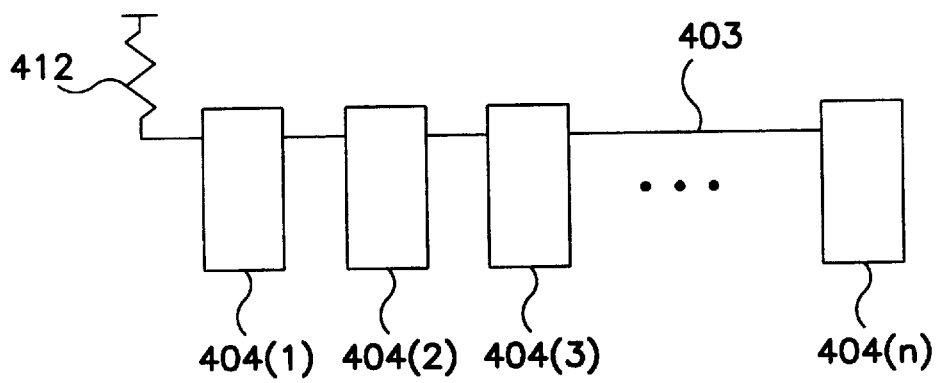
FIG. 4b is a diagram one embodiment of a termination scheme.
Figure 4C:
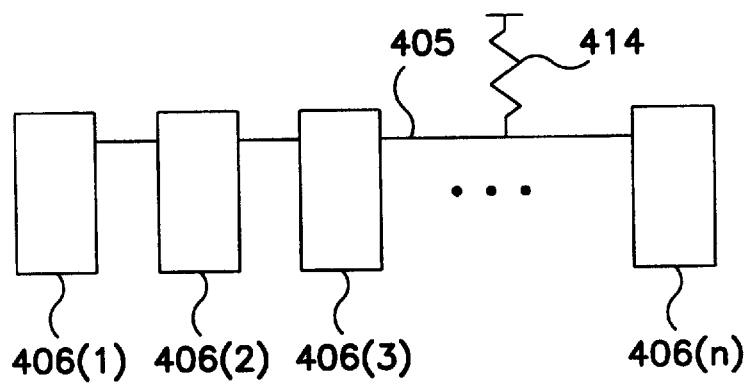
FIG. 4c is a diagram one embodiment of a termination scheme.

FIGS. 4a, 4b, and 4c are diagrams of alternate embodiments of termination schemes. FIG. 4a shows an embodiment in which signal line 401 is coupled to agents 402(1) through 402(n) and is terminated at either end through resistors 408 and 410. Signal line 401 may be an information signal line or a Vref signal line.

FIG. 4b shows an embodiment in which signal line 403 is coupled to agents 404(1) through 404(n) and is terminated at only one end through resistor 412.

FIG. 4c shows an embodiment in which signal line 405 is coupled to agents 406(1) through 406(n) and is terminated at a point between two agents 406 through resistor 414.

FIGS. 4a through 4c show some possible system topologies in which the present invention can be used. Other topologies, such as for example, star topologies could be used as effectively.

Figure 5:
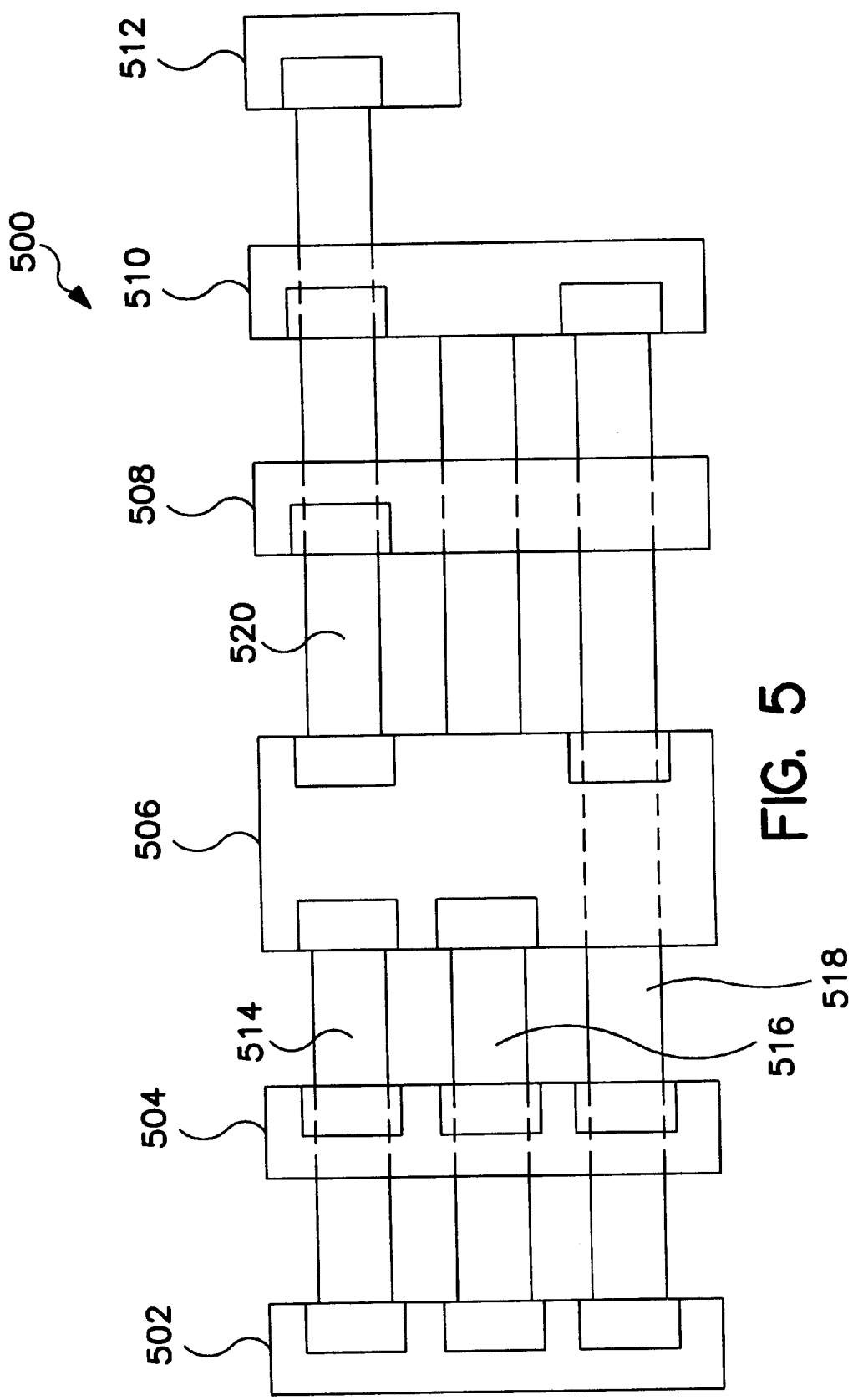
FIG. 5 is a diagram of one embodiment of signal groups and connected agents.

FIG. 5 is a diagram of system 500 showing a configuration of signal groups and agents according to one embodiment. System 500 includes agents 502, 504, 514, 506, 508, 510, and 512. Each of the agents in system 500 may be one of various computer system components that receive and/or transmit signals to other agents, such as microprocessors, memory controllers, transceivers or translators. Other embodiments could have different numbers of agents than shown in system 500.

System 500 includes four information signal line groups. Group 514 is coupled to agents 502, 504, and 506. Group 516 is coupled to agents 502, 504, and 506. Group 518 is coupled to agents 502, 504, 506, and 510. Group 520 is coupled to agents 506, 508, 510, and 512. The routings of all information signal lines within an information signal line group are matched. Each information signal line group may transmit or receive information signals over a different electrical signal carrying medium. Examples of various media include traces of a PCB, ribbon cable, or coaxial cable. Each information signal line group is associated with one Vref signal line whose routing is matched to the routing of the associated information signal line group.

Each of information signal line groups 514, 516, 518, and 520 may contain the same number of information signal lines or each may contain differing numbers of information signal lines. In one embodiment, for example, information signal line groups 514 and 516 each contain sixteen information signal lines, forming a 32-bit bus. Information signal line group 518 forms a narrower control bus.

Design-specific tradeoffs are involved in deciding how many information signal lines should constitute a group. If more information signal lines are included for each group, it eventually becomes impossible to duplicate the routing of all the information signal lines so as to gain the benefit of common system noise. On the other hand, less signal pins are required when more information signal lines grouped and matched to a single Vref line 206. An exact number of information signal lines can be decided upon in design-specific instances as needed.

Each agent of system 500 may have different capabilities to transmit or receive data. For example, agent 512 is a read-only agent, agents coupled to information signal line group 518 are write-only agents, and the remaining agents are read and write capable. In this embodiment, control of information signal line groups is independent. For example, agent 506 can simultaneously write using information signal line groups 514 and 516 and read using information signal line group 520 while information signal line group 518 is inactive.

Figure 6:
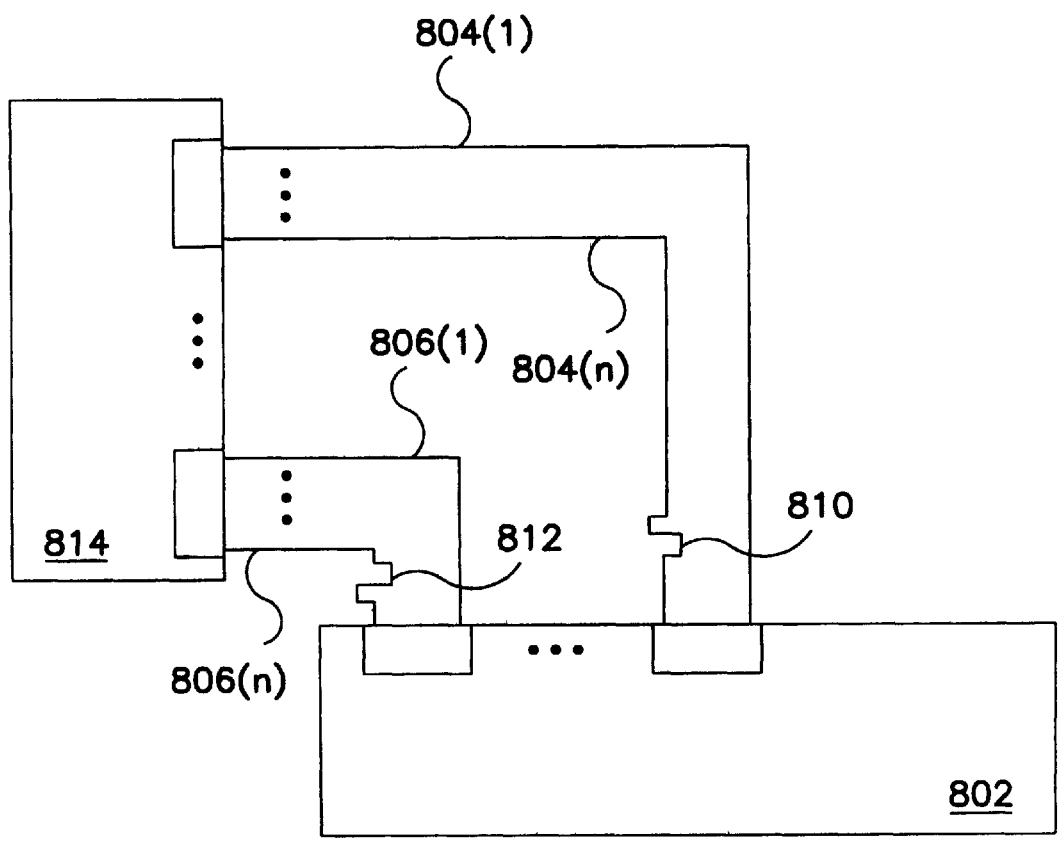
FIG. 6 is a diagram showing matched routing among signal groups.

FIG. 6 is a diagram showing one embodiment of two agents and two signal line groups. Agents 802 and 814 are system agents as previously described. Signal line groups 804 and 806 are each coupled to agents 802 and 814. Signal line group 804 includes signal lines 804(1) through 801(n). In this embodiment, signal lines 804 include more than one information signal line and one Vref signal line. The routings of all signal lines within group 804 are matched. As shown, a greater distance exists between agents 802 and 814 for signal line 804(1) than for signal line 804(n). In order to match the routing of signal line 804(1) to that of signal line 804(n), a series of turns 810 is introduced in the routing of signal line 804(n). This is an example of matching signal line lengths.

Similarly, the routings of all signal lines within group 806 are matched. A series of turns 812 is introduced in signal line 806(n) so that the length of signal line 806(n) will match that of signal line 806(1).

Routings within a group, such as group 804 or 806 are matched, but there is no requirement that any routings in one group match routings of another group. For example, group 804 could be routed using one medium, such as ribbon cable, and group 804 could be routed over traces of a PCB.

The lengths, or other matched characteristics, of signal lines within a group do not need to be absolutely identical for the routings to be matched. The characteristics of signal lines within a group must be matched within tolerances appropriate for the application, considering such factors as noise margin, for example.

Figure 7A:
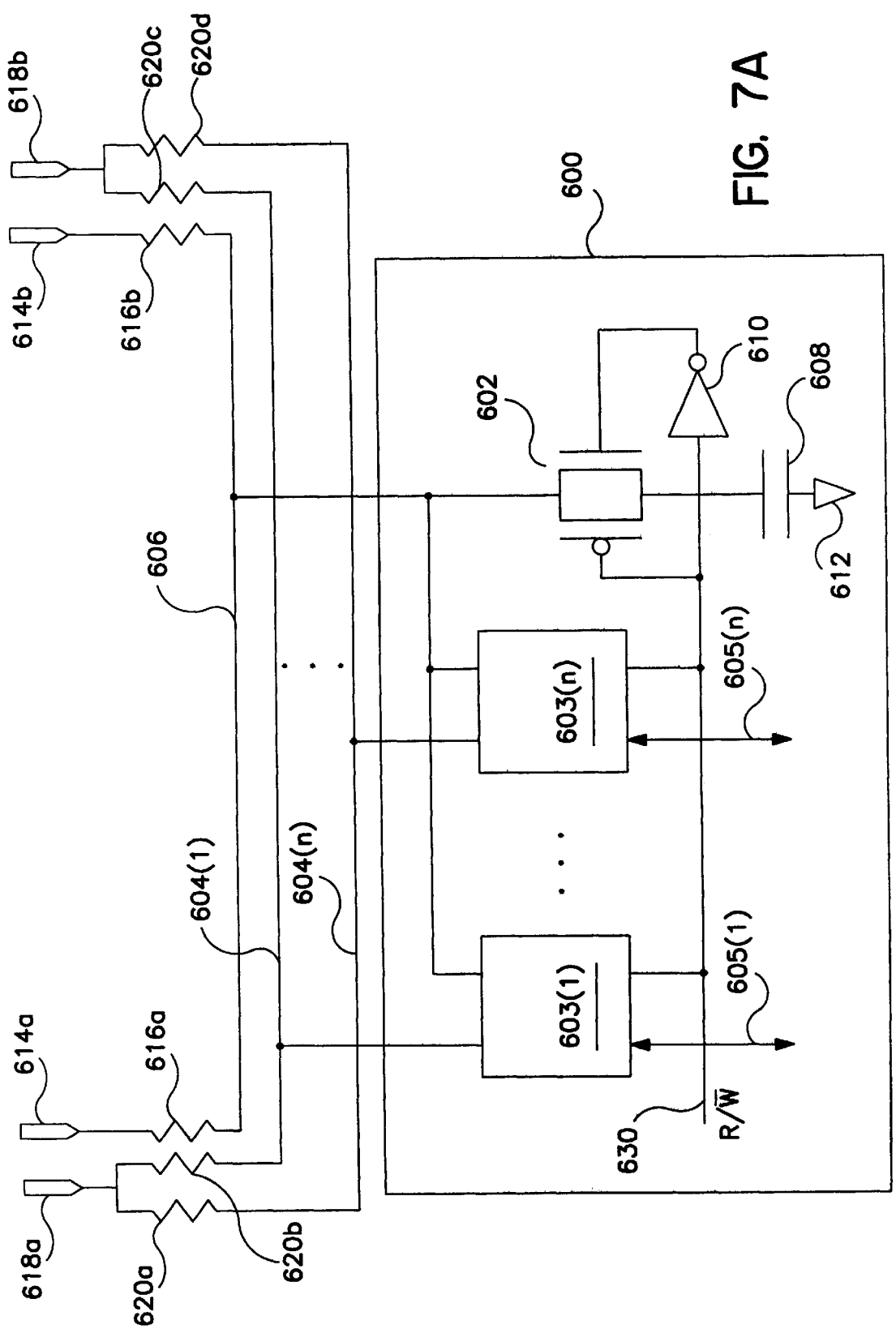
FIG. 7a is a diagram of one embodiment of an agent.

FIG. 7a is a diagram of one embodiment of an agent 600. Agent 600 is coupled to a bus that includes Vref signal line 606 and information signal lines 604(1) through 604(n). In this embodiment, information signal lines 604(1) and 604(n) are shown terminated to voltage sources 618a and 618b through resistors 620a, 620b, 620c, and 620d. Vref signal line 606 is terminated to voltage sources 614a and 614b through resistors 616a and 616b.

For each information signal line 604, agent 600 includes one data cell 603. In this embodiment, data cell 603(1) is couple to information signal line 604(1) and to Vref signal line 606. Data cell 603(n) is coupled to information signal line 604(n) and to Vref signal line 606. Each of data cells 603 is coupled to control line 630 which configures agent 600 as a writing (transmitting or driving) agent or as a reading (receiving) agent, as described more fully below.

Data cell 603(1) includes a signal line 605(1). Information signals are transmitted from signal line 605(1) to information signal line 604(1) when agent 600 is configured as a transmitting agent. Information signals are received from information signal line 604(1) to signal line 605(1) when agent 600 is configured as a receiving agent. Data cell 603(n) includes a signal line 605(n) for similarly receiving and transmitting information signals between signal line 605(n) and information signal line 604(n). The nature of signals transmitted from a data cell 603 on a signal line 605 vary according to the type of component the particular agent 600 is. For example, for an agent 600 that is a microprocessor, signal line 605 carries outgoing signals generated by core logic. For other types of agents 600, such as transceivers, signal line 605 carries outgoing signals generated by logic external to agent 600.

Control line 630 transmits a control signal that configures agent 600 as a transmitting agent that drives signals onto information signal lines 604 and Vref signal line 606 or as a receiving agent that receives signals from signal lines 604 and 606. In an embodiment in which agent 600 is a microprocessor, for example, a read/write (R/W) signal from core logic is transmitted on signal line 630. Any signal from any source that controls the input/output (I/O) protocol being used may be used on signal line 630. In this embodiment, when signal R/W has a low logic value, agent 600 is configured to transmit.

Agent 600 includes a noise coupling device including pass gate 602. When signal R/W is a low logic level, agent 600 is configured to transmit (write) and a low logic level is supplied to the p side of pass gate 602. A low signal R/W is inverted by inverter 610 to supply a high logic level to the n side of pass gate 602. In this condition, pass gate 602 is open. When pass gate 602 is opened, ground noise from the integrated circuit die of agent 600 is coupled through capacitor 608 to Vref signal line 606.

When signal R/W is a high logic level, agent 600 is configured to receive (read) and pass gate 602 is closed so that no die noise is coupled from agent 600 to Vref signal line 606.

The embodiment of FIG. 7a uses a GTL protocol in which a constant voltage level is maintained on information signal lines 604 and signaling is accomplished when a transmitting agent pulls an information signal line 604 low. In GTL therefore, ground noise from the integrated circuit die of agent 600 is the noise that will be coupled to the information signal line. In embodiments in which other protocols are used, different types of noise may be coupled from appropriate voltage sources.

Figure 7B:
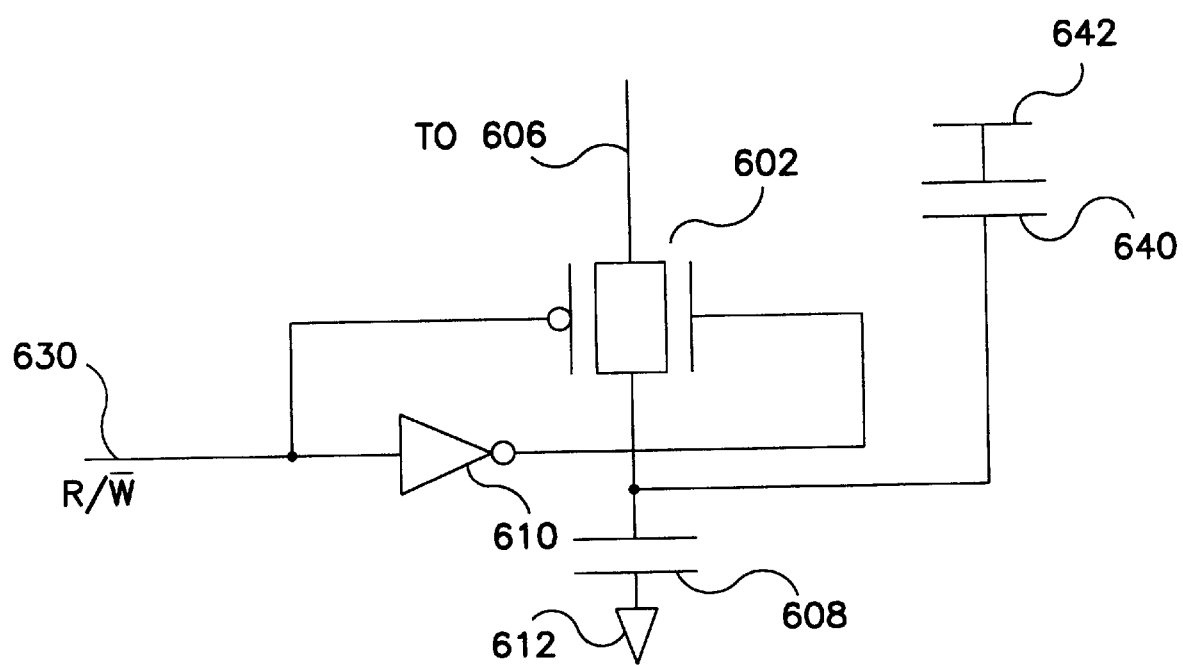
FIG. 7b is a diagram of one embodiment of circuitry of an agent.

FIG. 7b is a diagram of an embodiment in which a center tap termination (CTT) electrical protocol is used. In CTT, a constant voltage is maintained on information signal lines 604 and a transmitting agent pulls information signal lines below the constant value and pushes them above the constant value when signaling. Such an agent is called a push-pull driver. In this embodiment, pass gate 602 is opened and closed as in the embodiment of FIG. 7a. When pass gate 602 is opened and agent 600 is pulling an information signal line low, ground noise through capacitor 608 is coupled to the information signal line. In addition, when pass gate 602 is opened and agent 600 is pushing an information signal line high, noise from voltage source 642 is also coupled to the information signal line.

Agent 600 of FIG. 7a is an agent that can be configured to both transmit and receive. Other embodiments include agents that can only transmit or only receive. FIGS. 8a through 8d show various configurations of data cells for these various agents.

Figure 8A:
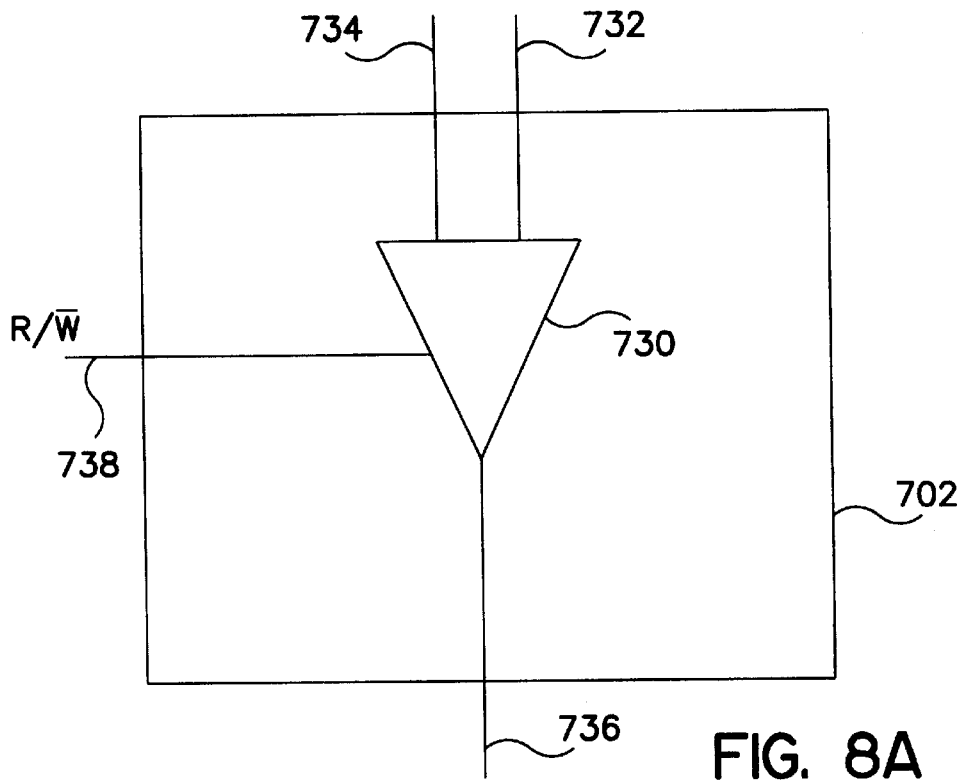
FIG. 8a is a diagram of one embodiment of a data cell.

FIG. 8a is a diagram of data cell 702 that is only capable of receiving. Differential amplifier 730 receives information signal line 734 and Vref signal line 732. Data cell 702 is enable to receive when there is a high R/W signal on control line 738. Differential amplifier 730 extracts signal 736 from information signal line 734 by sensing a difference in the voltage levels on lines 734 and 732. Because lines 734 and 732 have matched routing, lines 734 and 732 will have substantially similar noise elements, therefore, substantially all of the noise is rejected by differential amplifier 730.

Figure 8B:
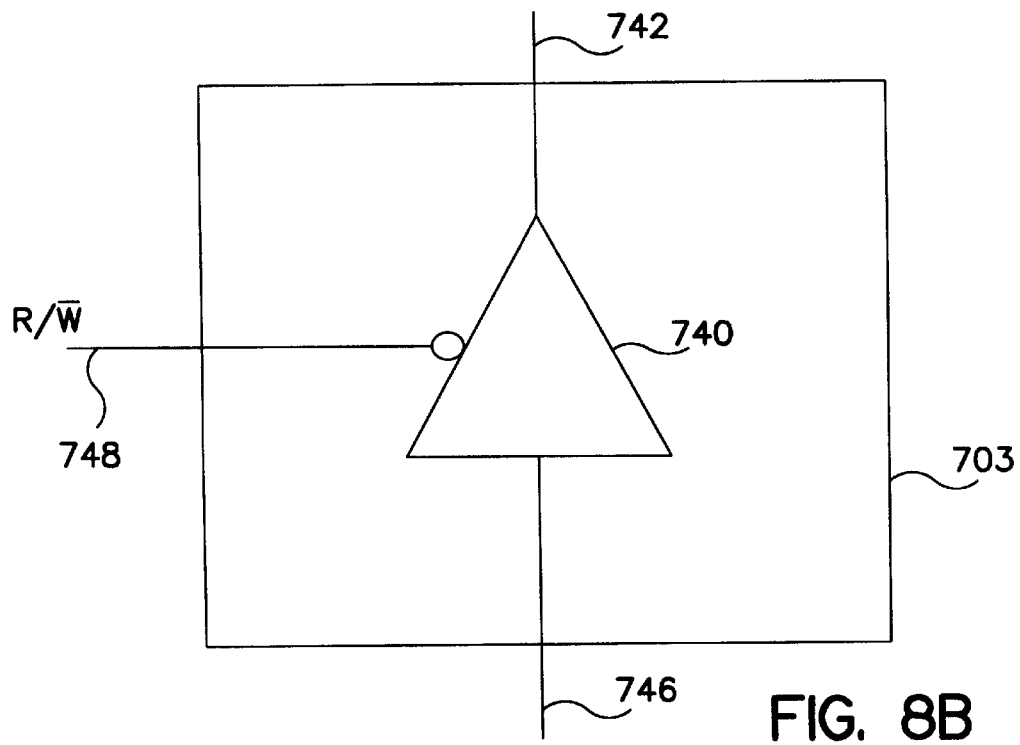
FIG. 8b is a diagram of one embodiment of a data cell.

FIG. 8b is a diagram of data cell 703 which is capable of transmitting only. When a low R/W signal is present on control line 748, buffer 740 is enabled to transmits a signal on signal line 746 to outgoing information signal line 742.

Figure 8C:
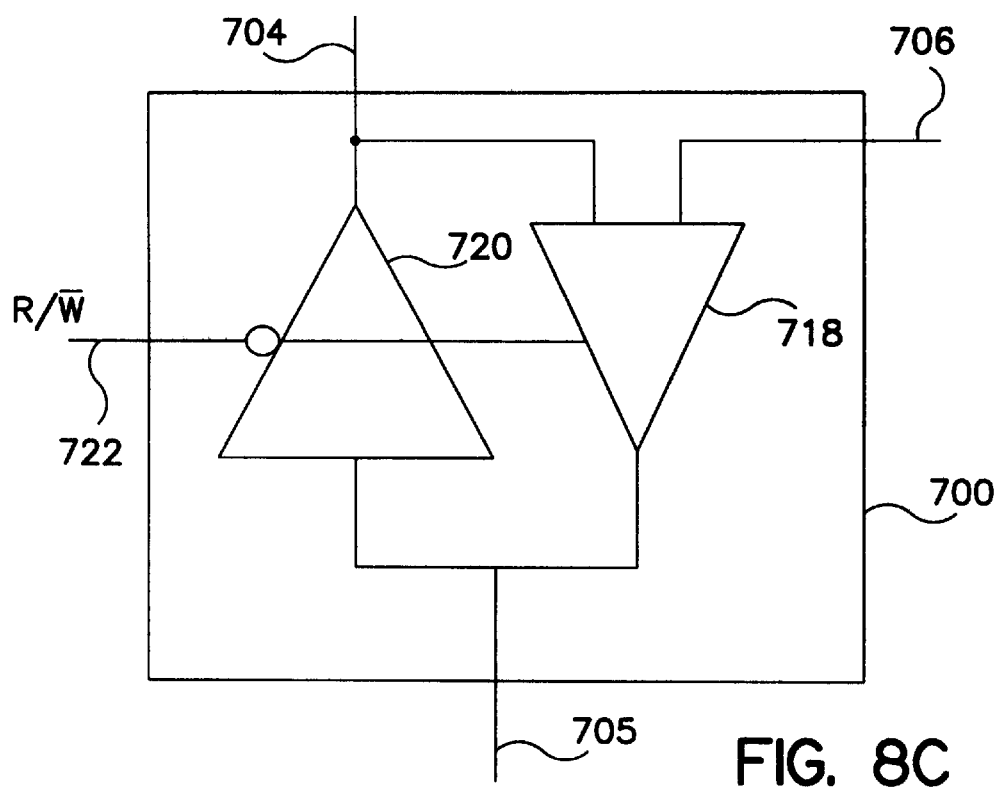
FIG. 8c is a diagram of one embodiment of a data cell.

FIG. 8c is a diagram of a data cell as described in the embodiment of FIG. 7a. Data cell 700 is configurable to either transmit or receive based upon the level of the R/W signal on control line 722. When the R/W signal is high, differential amplifier 718 is enabled to receive signals on information signal line 704 and Vref signal line 706 and to output a signal to signal line 705 as described with reference to FIG. 8a. When the R/W signal is low, buffer 702 is enabled as described with reference to FIG. 8b. In this case signal 705 is signal to be output to information signal line 704.

Figure 8D:
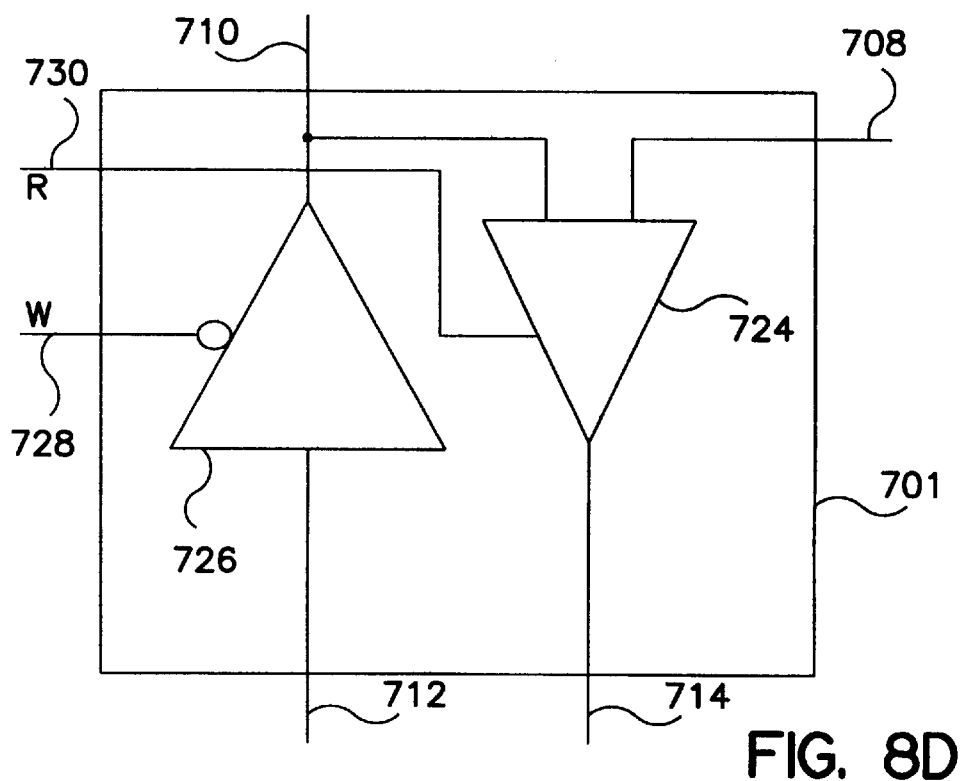
FIG. 8d is a diagram of one embodiment of a data cell.

FIG. 8d is a diagram of a data cell that is configurable to both transmit and receive. Data cell 701 can transmit and receive a signal simultaneously. This capability is useful, for example, in microprocessors that perform self snoops. In such microprocessors, internal snoops and external snoops are performed using the same logic. In the case of a self snoop, the processor that attempts the self snoop puts the snoop request onto an external bus as if it were a request to an external agent and then reads the request back in and processes it as if it were an externally generated snoop request.

When the read ("R") signal is active on control line 730, differential amplifier 724 is enabled to receive signals on information signal line 710 and Vref signal line 708 as previously described, and transmit an information signal to signal line 714. When the write ("W") signal is active on control line 728, buffer 726 is enabled to transmit information from signal line 712 to information signal line 710 as previously described. One or both of signal R and W may be active at one time.

What is claimed is:

1. A circuit comprising:
   a plurality of information signal lines having a substantially matched routing;
   a reference voltage line having a routing substantially matched to the routing of the plurality of information signal lines; and
   a transmitting agent coupled to the plurality of information signal lines and to the reference voltage signal line, including,
   a noise coupling circuit for coupling noise from the transmitting agent to the reference voltage line.

2. The circuit of claim 1, further comprising a receiving circuit for receiving a reference voltage signal on the reference voltage signal line and at least one information signal on at least one of the plurality of information signal lines, the receiving circuit rejecting noise that is common to the at least one information signal and the reference voltage signal.

3. The circuit of claim 1, wherein the noise coupling circuit comprises a coupling device for selectively coupling noise from a power supply voltage of the integrated circuit die of the transmitting agent to the reference voltage line.

4. The circuit of claim 3, wherein the noise is coupled when the transmitting agent receives a signal that causes the transmitting agent to control a bus.

5. The circuit of claim 4, wherein the signal is a write signal that has an origination point external to the integrated circuit die of the transmitting agent.

6. The circuit of claim 2, wherein the receiving circuit comprises a differential amplifier.

7. A circuit comprising:
   a plurality of information signal lines all with a commonly matched routing between a first agent and a second agent;
   a reference voltage line with a routing that is matched to the commonly matched routing;
   a receiving circuit coupled to at least one of the plurality of information signal lines and to the reference voltage line to receive at least one information signal and a reference voltage signal, the receiving circuit rejecting noise that is common to the at least one information signal and the reference voltage signal; and a transmitting circuit for selectively coupling noise from an integrated circuit die of the transmitting circuit to the reference voltage line.

8. The circuit of claim 7, wherein the receiving circuit and the transmitting circuit are each on an integrated circuit die of the first agent.

9. The circuit of claim 8, wherein the transmitting circuit couples the noise when the transmitting circuit receives a first signal that configures the first agent as a driving agent in control of the bus.

10. The circuit of claim 9, wherein the first signal is a write signal that originates externally to the first agent.

11. The circuit of claim 9, wherein the first signal is a write signal that originates in logic internal to the first agent.

12. The circuit of claim 9, wherein a second signal enables the receiving circuit to receive the at least one information signal and the reference voltage signal.

13. The circuit of claim 12, wherein the first signal configures the first agent as a driving agent at the same time the second signal enables the receiving circuit.

14. The circuit of claim 13, wherein the first signal and the second signal are each received on a read/write signal line of the agent, and wherein the first signal is a first voltage level on the read/write signal line and the second signal is a second voltage level on the read/write signal line.

15. The circuit of claim 14, wherein the first voltage level indicates a first logic level, and wherein the second voltage level indicates a second logic level that is the compliment of the first logic level.

16. The circuit of claim 13, wherein the receiving circuit comprises a differential amplifier that receives the at least one information signal with coupled noise and the reference voltage signal with coupled noise and extracts the at least one information signal.

17. An apparatus comprising:
a signal transmitting device;
a plurality of groups of signal lines coupled to the signal transmitting device, wherein a routing of a group of signal lines of the plurality of groups is substantially matched; and
a plurality of reference voltage lines coupled to the transmitting device, wherein each reference voltage line is associated with one of the groups of signal lines, and wherein each of the reference voltage lines has a routing that is substantially matched to a routing of the associated group of signal lines.

18. The apparatus of claim 17, wherein the signal transmitting device comprises a noise coupling circuit for coupling noise characteristic of the transmitting device to each of the plurality of reference voltage lines.

19. The apparatus of claim 18, further comprising a receiving device coupled to the plurality of groups of signal lines and to the plurality of reference voltage lines for receiving a signal from a signal line of one of the groups of signal lines and rejecting noise common to the signal line and a reference voltage line whose routing matches a routing of the signal line.

20. The apparatus of claim 18, wherein the coupling circuit comprises a pass gate that couples the noise when the pass gate is opened by an enable signal.

21. The apparatus of claim 17, wherein a first group of signal lines of the plurality of groups of signal lines comprises a first number of signal lines, and wherein a second group of signal lines of the plurality of groups of signal lines comprises a second number of signal lines.

22. An apparatus comprising:
a bus comprising:
at least one group of information signal lines, wherein each information signal line in the at least one group has at least one electrical characteristic in common with all other information signal lines in the at least one group; and
a reference voltage signal line associated with the at least one group of information signals, wherein the reference voltage signal line has at least one electrical characteristic in common with the information signal lines in the at least one group; and
a plurality of signal transmitting agents each coupled to the bus.

23. The apparatus of claim 22, further comprising a receiving agent for receiving an information signal from the at least one group of information signal lines and for receiving a reference voltage signal from the reference voltage signal line, wherein the receiving agent includes a common mode rejection device for rejecting noise that is common to the information signal and to the reference voltage signal.

24. The apparatus of claim 23, wherein the common noise rejection device comprises a differential amplifier.

25. The apparatus of claim 22, wherein at least one of the plurality of signal transmitting agents comprises a transmitting agent for transmitting an information signal to the at least one group of information signal lines and to transmit a reference signal over the reference voltage signal line, wherein the transmitting agent comprises a noise coupling circuit for coupling at least one noise characteristic of the transmitting agent to the reference voltage signal line.

26. In an integrated circuit of a computer system, a circuit comprising:
a reference voltage line;
a plurality of information signal lines having a routing that is matched to a routing of the reference voltage signal line; and
a transmitting device coupled to the reference voltage signal line and to the plurality of information signal lines including a coupling device for coupling die noise of the integrated circuit onto the reference voltage line when the integrated circuit is configured as a driving agent.

27. The circuit of claim 26, further comprising:
receiving device coupled to the reference voltage signal line and to the plurality of information signal lines, including a common mode rejection device for rejecting noise that is common to the information signal and the reference voltage signal.

28. The circuit of claim 27, wherein the common mode rejection device is a differential amplifier.

29. The circuit of claim 28, wherein the coupling device is comprised of a pass gate and a capacitor to a supply voltage level of the integrated circuit.

30. The circuit of claim 29, further comprising an input that receives a signal that turns the pass gate on when the integrated circuit is configured as a transmitter and turns the pass gate off when the integrated circuit is configured as a receiver.

31. The circuit of claim 30, wherein the signal indicates whether the integrated circuit has control of a system bus.

32. A computer system comprising:
a plurality of information signal lines routed over a signal carrying medium, wherein a routing of each of the information signal lines is matched;

a reference voltage signal line routed over the medium, wherein a routing of the reference voltage signal line is matched to the routing of the plurality of information signal lines; and a plurality of integrated circuit agents, each configurable as a differential receiver and as a driver, each of the plurality of agents including a coupling device that selectively couples noise associated with an integrated circuit die of an agent to the reference voltage signal line when the agent is configured as a driver with control of a system bus.

33. The computer system of claim 32, wherein the plurality of information signal lines comprises sixteen information signal lines.

34. The computer system of claim 32, wherein each of the plurality of agents further comprises a common mode rejection device that receives an information signal and a reference voltage signal when the agent is configured as a receiver.

35. The computer system of claim 34, wherein the common mode rejection device is a differential amplifier.

36. The computer system of claim 34, wherein the coupling device is comprised of a pass gate and a capacitor to a supply voltage level of the integrated circuit.

37. The computer system of claim 36, further comprising an input that receives a signal that turns the pass gate on when the agent is configured as a driver and turns the pass gate off when the agent is configured as a receiver.

38. The computer system of claim 37, wherein the signal indicates whether the integrated circuit has control of a system bus.

39. A method for reducing the effect of noise on information signals transmitted by a driving agent to a receiving agent, comprising the steps of:

matching a routing of a reference voltage signal line over a transmission medium to a routing of a plurality of information signal lines between the driving agent and the receiving agent; and coupling die noise of the driving agent to the reference voltage signal.

40. The method of claim 39, wherein the transmission medium is traces of a printed circuit board (PCB).

41. The method of claim 39, wherein the die noise comprises noise from a power voltage supply of an integrated circuit of the driving agent.

42. In a system including a plurality of agent and a plurality of signal lines having a matched routing between agents, a method of transmitting signals between agents comprising the steps of:

at a driving agent of the plurality of agents, coupling noise characteristic of the agent to a reference voltage signal;

transmitting the reference voltage signal with the coupled noise over a reference voltage signal line that has a routing matched to the routing of the plurality of signal lines; and transmitting an information signal over one of the plurality of information signal lines.

43. The method of claim 42, further comprising the steps of:

at a receiving agent of the plurality of agents, receiving the reference voltage signal with the coupled noise and the information signal; and processing the signals and noise received so as to reject noise common to the reference voltage signal and the information signal.

44. The method of claim 43, wherein the step of processing includes the step of inputting the reference voltage signal and the information signal to a differential amplifier.

45. The method of claim 42, wherein the step of coupling noise comprises coupling a supply voltage source to the reference voltage signal line.

* * * * *